(12) United States Patent
Bauer

(10) Patent No.: US 11,091,684 B2
(45) Date of Patent: Aug. 17, 2021

(54) ORGANOCLAY COMPOSITIONS AND OIL-BASED DRILLING FLUID COMPRISING THE CLAYS

(71) Applicant: BYK USA, Inc., Wallingford, CT (US)

(72) Inventor: Patricia M. Bauer, Gonzales, TX (US)

(73) Assignee: BYK USA INC., Wallingford, CT (US)

( * ) Notice: Subject to any disclaimer, the term of this patent is extended or adjusted under 35 U.S.C. 154(b) by 105 days.

(21) Appl. No.: 16/093,189

(22) PCT Filed: Apr. 26, 2017

(86) PCT No.: PCT/US2017/029658
§ 371 (c)(1),
(2) Date: Oct. 12, 2018

(87) PCT Pub. No.: WO2017/189738
PCT Pub. Date: Nov. 2, 2017

(65) Prior Publication Data
US 2019/0062615 A1    Feb. 28, 2019
US 2020/0181474 A9    Jun. 11, 2020

Related U.S. Application Data

(60) Provisional application No. 62/329,814, filed on Apr. 29, 2016.

(51) Int. Cl.
*C09K 8/36* (2006.01)
*C01B 33/44* (2006.01)
(Continued)

(52) U.S. Cl.
CPC ............... *C09K 8/36* (2013.01); *C01B 33/44* (2013.01); *C09K 8/32* (2013.01); *C09K 8/54* (2013.01);
(Continued)

(58) Field of Classification Search
None
See application file for complete search history.

(56) References Cited

U.S. PATENT DOCUMENTS 5,336,647 A * 8/1994 Nae .................. C01B 33/44
210/660
5,429,999 A * 7/1995 Nae .................. A61K 8/26
106/487
(Continued)

FOREIGN PATENT DOCUMENTS

EP         0133071 A2    2/1985
WO    WO 2015/138407 A1    9/2015

OTHER PUBLICATIONS

PCT/US2017/029658—International Search Report, dated Jun. 29, 2017.
(Continued)

*Primary Examiner* — John J Figueroa
(74) *Attorney, Agent, or Firm* — Curatolo Sidoti Co., LPA; Salvatore A. Sidoti

(57) ABSTRACT

An organoclay composition comprising a mineral clay mixture which has been treated with a combination of quaternary ammonium salts, said mixture comprising: mineral clay (a) comprising about 15 to about 60 wt. %, based on the weight of the mineral clay mixture, of sepiolite; mineral clay (b) comprising about 40 to about 85 wt. % based on the weight of the mineral clay mixture, of montmorillonite; an alkyl or alkenyl quaternary ammonium salt and an alkoxylated quaternary ammonium salt.

25 Claims, 2 Drawing Sheets

(51) Int. Cl.
  *C09K 8/32* (2006.01)
  *C09K 8/54* (2006.01)
  *C09K 8/502* (2006.01)

(52) U.S. Cl.
  CPC .......... *C09K 8/502* (2013.01); *C09K 2208/18* (2013.01); *C09K 2208/32* (2013.01)

(56) References Cited

U.S. PATENT DOCUMENTS

| | | |
|---|---|---|
| 5,718,841 A | 2/1998 | Mardis et al. |
| 5,759,938 A | 6/1998 | Cody et al. |
| 5,837,654 A * | 11/1998 | Carroll .................... C09K 8/32 507/100 |
| 6,036,765 A | 3/2000 | Farrow et al. |
| 6,103,687 A | 8/2000 | Cody et al. |
| 6,130,256 A | 10/2000 | Nae |
| 6,187,719 B1 | 2/2001 | Dino et al. |
| 6,211,139 B1 | 4/2001 | Keys et al. |
| 6,462,096 B1 | 10/2002 | Dino et al. |
| 7,345,010 B2 | 3/2008 | Thompson et al. |
| 7,939,470 B1 | 5/2011 | Wagle et al. |
| 8,389,447 B2 | 3/2013 | Dino et al. |
| 2007/0197403 A1 | 8/2007 | Dino et al. |
| 2007/0197711 A1 | 8/2007 | Ijdo et al. |
| 2010/0305008 A1 | 12/2010 | Dino et al. |
| 2014/0350153 A1 | 11/2014 | Gawad et al. |
| 2015/0051121 A1 | 2/2015 | Dino et al. |
| 2015/0299557 A1 | 10/2015 | Hussein et al. |
| 2016/0009899 A1 | 1/2016 | Ijdo et al. |
| 2016/0009977 A1 | 1/2016 | Lu |
| 2016/0009978 A1 | 1/2016 | Dino et al. |
| 2016/0186034 A1 * | 6/2016 | Mainye .................... C09K 8/32 507/103 |
| 2017/0058181 A1 * | 3/2017 | Frantz .................... C04B 22/16 |

OTHER PUBLICATIONS

PCT/US2017/029658—International Written Opinion, dated Jun. 29, 2017.
PCT/US2017/029658—International Preliminary Report on Patentability, dated Jun. 13, 2018.

* cited by examiner

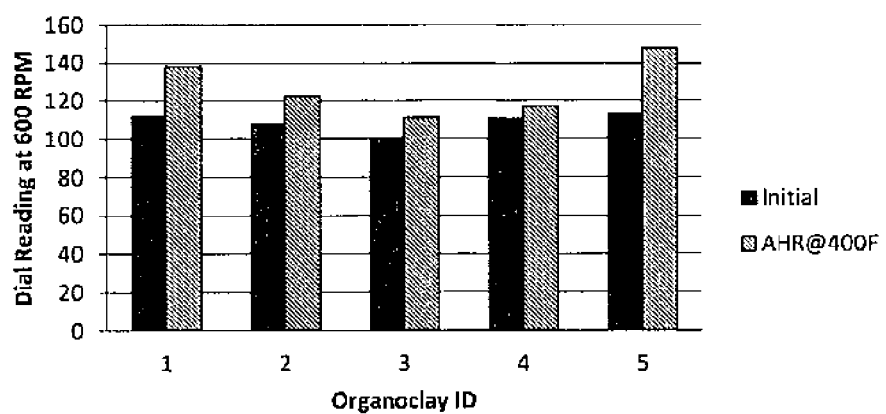
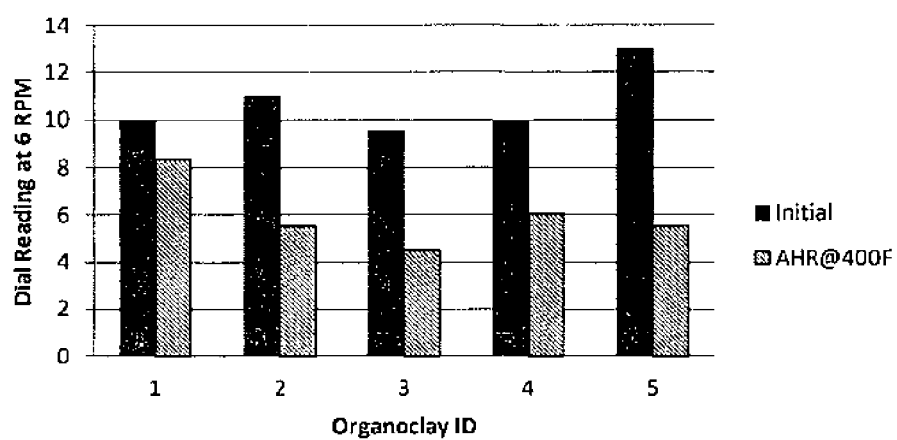

YP Data

ORGANOCLAY COMPOSITIONS AND OIL-BASED DRILLING FLUID COMPRISING THE CLAYS

Provided are organophilic phyllosilicates (hereinafter referred to as "organoclays"), and more specifically organoclays prepared from particular mineral clay mixtures which have been treated with a combination of quaternary ammonium compounds. The resultant organoclays are useful as functional additives for nonaqueous fluid systems, where they may confer desired rheological properties, or may confer other mechanical or physical properties sought for such systems.

In particular, the rheological properties of organoclays are of importance in drilling fluids. In the course of drilling an oil, gas or water well by means of rotary drilling tools, the drill pipe and bit are rotated to drill out the borehole. A so-called "drilling fluid" or "drilling mud" is circulated downwardly through the hollow drill stem and bit nozzles to the bottom of the borehole and then upwardly through the surface through the annular space between the drill stem and the interior of the borehole. This drilling fluid comprises a suspension of solid material in a liquid medium and may contain other added agents. The drilling fluid lubricates and cools the drill bit, and suspends and carries cuttings out of the borehole. In order to perform these and other functions the drilling fluid should desirably have certain physical characteristics. These include a shear-thinning viscosity that enables it to be pumped and circulated. Also the fluid should have sufficient gel strength that cuttings will remain suspended in the borehole if circulation of the fluid pumping is stopped, as for example by a mechanical failure.

In those instances where the drilling fluid has an oil base, organoclays have long been used as thickeners and/or suspending agents. These organoclays, representing the reaction product of a smectite-type clay with a quaternary ammonium compound, are known in the art. The drilling fluids of the prior art which incorporate these organoclays have provided satisfactory performance under relatively moderate operating temperatures. However where drilling temperatures begin to exceed around 300° F., conventional organoclays other than those based on hectorite begin to perform poorly. Particularly in the higher range extending to 400-500° F. or higher, these conventional drilling fluids (including those based on hectorite organoclays) have displayed an undesirable loss in viscosity and gel strength.

It has unexpectedly been discovered that combinations of certain clay minerals, including montmorillonite, which has previously been considered unsuitable for use in high temperature, high pressure drilling fluid applications, may be reacted with a combination of quaternary ammonium compounds to provide organoclay compositions which are highly useful in high temperature, high pressure drilling fluid applications.

The additive composition includes a synergistic combination of a sepiolite organoclay composition and a montmorillonite organoclay composition. The sepiolite and montmorillonite organoclay compositions include organic cations provided by an alkoxylated quaternary ammonium salt and by an alkyl or alkenyl quaternary ammonium salt that is not alkoxylated.

BRIEF DESCRIPTION OF THE DRAWINGS

In the drawings appended hereto:

FIG. 1 is a graphical representation of the 600 RPM test results for various organoclays initially and after hot rolling at 400° F.

FIG. 2 is a graphical representation of the 6 RPM test results for various organoclays initially and after hot rolling at 400° F.

Figure 3:
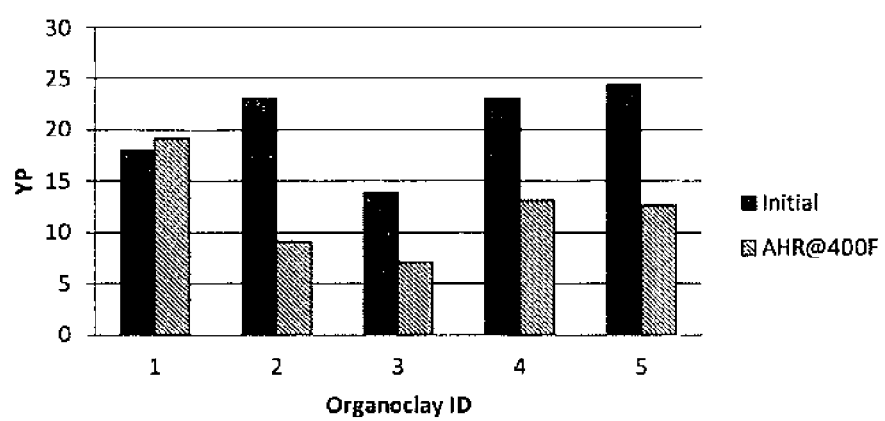
FIG. 3 is a graphical representation of the Yield Point test results for various organoclays initially and after hot rolling at 400° F.

The inability of a montmorillonite-type clay to withstand temperatures at or greater than about 350° F. in a high pressure/high temperature (HPHT) drilling fluid application is widely known. Provided are organoclay compositions containing a mixture of montmorillonite and sepiolite treated with a blend of an alkyl or alkenyl quaternary ammonium compound and an alkoxylated quaternary ammonium compound, exhibiting improved rheology stability when used in drilling fluids designed for this type application, at or greater than 400° F., while maintaining a good initial viscosity profile. The subject organoclay compositions provide greater rheology stability versus commercial single mineral/single surfactant additives, as well as versus commercial single mineral/mixed surfactant additives.

The subject organoclay compositions comprise mineral clay mixtures which have been treated with quaternary ammonium compounds. Such mineral clay mixtures comprise: mineral clay (a) comprising about 15 to about 60 wt. %, based on the weight of the mineral clay mixture, sepiolite; and mineral clay (b) comprising about 40 to about 85 wt. % based on the weight of the mineral clay mixture, of montmorillonite. Mineral clay (a) may be present in an amount of 20 to about 55 wt. %, optionally 20 to about 50 wt. %, based on the weight of the mineral clay mixture. Mineral clay (b) may be present in an amount of 45 to about 80 wt. %, optionally 50 to about 80 wt. %, based on the weight of the mineral clay mixture. The weight percentages of the clay materials are based on the un-treated, dry weight of the clay materials.

Montmorillonite is a soft phyllosilicate having two tetrahedral sheets of silica sandwiching a central octahedral sheet of alumina. The particles are plate-shaped with an average diameter around 1 μm and a thickness of $9.6 \times 10^{-9}$ m. Montmorillonite provides large plates and significant hydrogen bonding, having greater than 50% octahedral charge at least in part due to isomorphous substitution of Mg for Al in the central alumina plane. The substitution of lower valence cations leaves the nearby oxygen atoms with a net negative charge that can attract cations, providing its cationic exchange capacity.

Sepiolite is included in the phyllosilicates because it contains a continuous two-dimensional tetrahedral sheet of composition $T_2O_5$ (T=Si, Al, Be, . . . ) but it differs from the other layer silicates in lacking continuous octahedral sheets. (B. F. Jones and E. Galan "Sepiolite and Palygorskite", Chapter 16 of Hydrous Phyllosilicates, Reviews in Mineralogy, Volume 19, Mineralogical Society of America, Washington, D.C., 1988).

The processing of the organoclays includes dispersing the clays in water at concentrations of about 1.5% to about 10% based on the weight of the dispersion, in certain embodiments, about 3% to about 8% based on the weight of the dispersion, with refining to remove impurities and with adequate shear to exfoliate/debundle the clay particles. Further processing includes adding the organic quaternary ammonium compounds to convert the hydrophilic clays into hydrophobic organoclays with subsequent filtration and drying to remove the water. In certain embodiments, the organoclays are converted into a milled powder as a final form while in other embodiments the final form is spray-dried beads.

In one procedure for preparing the organoclay composition, the sepiolite and montmorillonite minerals are crushed, ground, slurried in water and refined to remove grit and other impurities, such as by screening, cycloning or centrifuging. Each of the component minerals may then be subjected as a dilute (such as 1 to 6% solids) aqueous slurry to high shearing in a suitable mill, such as a homogenizing mill of the type wherein high speed fluid shear of the slurry is effected by passing the slurry at high velocities through a narrow gap, across which a high pressure differential is maintained. This type of action can, e.g., be effected in the well-known Manton-Gaulin "MG" mill, which device is sometimes referred to as the "Gaulin homogenizer". U.S. Pat. Nos. 4,664,842 and 5,110,501 provide details of such mill and its use.

Other instruments which can provide high shearing of the clay components may be used as well. The use of high shear is useful for processing montmorillonite, and acts to "debundle" the otherwise "bundled" type of structures which exist in the sepiolite mineral.

Following the high shear step, the clay components slurries may be mixed with one another. Alternatively, the two or more clay components can be intermixed in a single slurry before the latter is subjected to the high shear step. Following such steps the (single) slurry is intermixed with the quaternary ammonium salts sequentially or in combination, after which the slurry is dewatered, and the quaternary ammonium-treated clay is filtered and dried to provide a dry organoclay product, as a milled powder or spray dried beads.

In one embodiment, the alkoxylated quaternary ammonium salt or mixtures thereof may be provided by a compound selected from the group having the following formula:

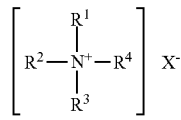

wherein N is nitrogen; $X^-$ comprises an anion selected from the group consisting of chloride, methyl sulfate, acetate, iodide, and bromide, in certain embodiments chloride; $R^1$=a $C_{12}$ to $C_{30}$, in certain embodiments $C_{12}$ to $C_{22}$, in other embodiments $C_{14}$-$C_{22}$, and in further embodiments $C_{16}$ to $C_{18}$ linear or branched, saturated or unsaturated alkyl or alkenyl group, and in still other embodiments $R^1$=a $C_{16}$ to $C_{18}$ linear saturated alkyl group; $R^2$=H— or a $C_1$ to $C_{30}$ linear or branched, saturated or unsaturated alkyl or alkenyl group, in certain embodiments $R^2$=H—, methyl, or a $C_{16}$ to $C_{18}$ linear saturated alkyl group, and in further embodiments a methyl group; $R^3$=H—, $C_1$ to $C_4$ linear or branched, saturated or unsaturated alkyl or alkenyl group or $R^4$, and; $R^4$=—$(CR^9R^{10}$—$CR^{11}R^{12}O)_yH$, or —$(CR^9R^{10}$—$CR^{11}R^{12}$—$CR^{13}R^{14}O)_yH$, where $R^9$, $R^{10}$, $R^{11}$, $R^{12}$, $R^{13}$ and $R^{14}$ are independently selected from the group consisting of H—, $CH_3$—, and $CH_3CH_2$—, in certain embodiments $R^9$, $R^{10}$, $R^{11}$, $R^{12}$, $R^{13}$ and $R^{14}$ are independently selected from the group consisting of H—, $CH_3$—, and $CH_3CH_2$—, in further embodiments $R_9$, $R_{10}$, $R_{11}$, $R_{12}$, $R^{13}$ and $R^{14}$ are independently selected from the group consisting of H—, and $CH_3$—, and in other embodiments $R^9$, $R^{10}$, $R^{11}$, $R^{12}$ and $R^{14}$ are H—; and y is on average 4 to about 20 in certain embodiments, in other embodiments about 10 to about 20, and in further embodiments 4 to about 15.

In another embodiment, $R^1$=$C_{16}$ to $C_{18}$ linear saturated alkyl group; $R^2$=a methyl group; $R^3$ and $R^4$ are $(CR^9R^{10}$—$CR^{11}R^{12}O)_yH$ where $R^9$, $R^{10}$, $R^{11}$, and $R^{12}$ are independently selected from the group consisting of H—, $CH_3$—, and $CH_3CH_2$—; and y is 4 to 15 on average. In one such embodiment, $R^9$, $R^{10}$, $R^{11}$, and $R^{12}$ are H and y is on average about 7.5.

The raw materials used to make these quaternary ammonium compounds can be derived from natural oils such as tallow, soy, coconut and palm oil. Useful aliphatic groups in the above formula may be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha olefins. Representative examples of useful branched, saturated radicals included 12-methylstearyl and 12-ethylstearyl. In certain embodiments, an amine with similar functionalities can be used by converting it to the quaternary compound in-situ.

Illustrative examples of suitable alkoxylated quaternary ammonium chloride compounds include, for example, methyl bis(polyoxyethylene [15])cocoalkyl quaternary ammonium chloride, methyl bis(polyoxyethylene [15])oleyl quaternary ammonium chloride, and methyl bis(polyoxyethylene [15])octadecyl quaternary ammonium chloride, wherein the numbers in brackets refer to the total number of ethylene oxide units. In one embodiment, the alkoxylated quaternary ammonium salt is octyldecylmethyl [polyoxyethylene (15)] quaternary ammonium chloride.

In certain embodiments, the mineral clay mixture is treated with about 15 to about 45 milliequivalents of the alkoxylated quaternary ammonium salt per 100 g of the mineral clay mixture, in certain embodiments, about 20 to about 30 milliequivalents.

Although the alkoxylated quaternary ammonium salts may contain alkyl or alkenyl groups, when referred to herein, the "alkyl or alkenyl quaternary ammonium salts" are not alkoxylated quaternary ammonium salts.

The alkyl or alkenyl quaternary ammonium compounds salt or mixtures thereof may be provided by a compound selected from the group having the following formula:

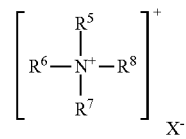

wherein $R^5$ comprises a group selected from linear or branched, saturated or unsaturated aliphatic (i.e. alkyl, alkenyl or alkynyl) hydrocarbon groups having from 8 to 30 carbon atoms; in certain embodiments, $R^5$=$C_{12}$ to $C_{22}$ linear or branched saturated alkyl groups, in other embodiments $C_{14}$-$C_{22}$ linear or branched saturated alkyl groups, and in further embodiments $R^5$=$C_{16}$ to $C_{18}$ linear or branched saturated alkyl groups; $R^6$, $R^7$, and $R^8$ are independently selected from the group consisting of: a) linear or branched, saturated or unsaturated aliphatic hydrocarbon, having from 1 to about 30 carbon atoms; b) allyl, vinyl, or other alkenyl or alkynyl groups possessing reactive unsaturation and having from 2 to about 30 carbon atoms; and c) hydrogen; and $X^-$ comprises an anion selected from the group consisting of chloride, methyl sulfate, acetate, iodide, and bromide; preferably chloride. In certain embodiments $R^5$ and one of $R^6$, $R^7$, and $R^8$ may be a $C_{14}$-$C_{22}$ alkyl group, and two of $R^6$, $R^7$, and $R^8$ may be a methyl group.

The raw materials used to make these quaternary ammonium compounds can be derived from natural oils such as tallow, soya, coconut and palm oil. Useful aliphatic groups in the above formula may be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha olefins. Representative examples of useful branched, saturated radicals included 12-methyistearyl and 12-ethylstearyl. In certain embodiments, an amine with similar functionalities can be used by converting it to the quaternary compound in-situ.

In certain embodiments, the alkyl or alkenyl quaternary ammonium salt contains at least one, optionally two or three, hydrocarbon chains having from about 8 to about 30 carbon atoms, and methyl groups.

The alkyl or alkenyl quaternary ammonium compound may be selected from dimethyl bis[fatty alkyl]ammonium, methyl tris[fatty alkyl]ammonium quaternary salts and mixtures thereof.

Illustrative examples of alkyl or alkenyl quaternary ammonium compounds used to make the subject organoclay compositions include but are not limited to dimethyl bis [hydrogenated tallow]ammonium chloride (2M2HT), and methyl tris[hydrogenated tallow alkyl]chloride (M3HT).

In one embodiment, the alkyl or alkenyl quaternary ammonium compound is dimethyl bis[hydrogenated tallow] ammonium chloride (2M2HT).

In one embodiment, the alkoxylated quaternary ammonium compound is octyldecylmethyl (polyoxyethylene [15]) quaternary ammonium chloride (C18EO15) and the alkyl or alkenyl quaternary ammonium compound is dimethyl bis [hydrogenated tallow]ammonium chloride (2M2HT).

In certain embodiments, the mineral clay mixture is treated with about 45 to about 100 milliequivalents of the alkyl or alkenyl quaternary ammonium salt per 100 g of the mineral clay mixture in other other embodiments, about 60 to about 100 milliequivalents, and in still other embodiments, about 70 to about 95 milliequivalents.

The amount of the quaternary ammonium compound added to the clay(s) should be sufficient to provide the clay(s) with the characteristics desired. Such characteristics include stability at elevated temperatures and the processability of the organoclay.

In certain embodiments, the amount of the organic cation providing compound reacted with the clay may be calculated as an approximate percentage of the cationic exchange capacity of the phyllosilicate clay. For example, the milliequivalent amount of the quaternary ammonium compound(s) reacted with 100 grams clay (MER) divided by the cation exchange capacity (CEC) of the clay sample and multiplied by 100 may be expressed as the MER percent of the CEC. The cation exchange capacity (CEC) of the clay can be determined using standard analytical techniques which are known in the art.

In certain embodiments, the amount of cationic quaternary ammonium compound(s) may be about 80 to about 160% of the CEC for the alkyl or alkenyl quaternary ammonium salt and about 10 to about 70% of the CEC for the alkoxylated quaternary ammonium salt. In other embodiments, the amount of cationic quaternary ammonium compound(s) may be about 100 to about 150% of the CEC for the alkyl or alkenyl quaternary ammonium salt and about 13 to about 62% of the CEC for the alkoxylated quaternary ammonium salt. In some embodiments, the amount of cationic quaternary ammonium compound(s) may be about 110 to about 140% of the CEC for the alkyl or alkenyl quaternary ammonium salt and about 19 to about 53% of the CEC for the alkoxylated quaternary ammonium salt.

Compounds useful for the alkyl or alkenyl quaternary ammonium compounds and/or the alkoxylated quaternary ammonium compounds are manufactured by Akzo Nobel, CECA (a subsidiary of the Arkema group), Evonik, Solvay, Stepan Company and KAO Chemical Company of Japan. Also, useful commercial products are pre-mixed two organic cation fluids containing both of the quaternary ammonium compounds described above.

The preparation of the organic salts can be achieved by techniques well-known in the art. The alkoxylated quaternary ammonium compounds can typically be prepared by reacting primary or secondary amines with alkylene oxides, such as ethylene and propylene oxide, followed by quaternization. For example, when preparing a quaternary ammonium salt, one skilled in the art may prepare a dialkyl secondary amine, for example, by the hydrogenation of nitriles, as disclosed in U.S. Pat. No. 2,355,356, and then form an alkoxylated dialkyl tertiary amine by reaction with alkylene oxides such as ethylene and propylene oxides.

In certain embodiments, the drilling fluid comprises an oil based or invert emulsion drilling fluid base composition, in which the continuous phase is hydrocarbon-based. The base fluid may comprise diesel ail, mineral oil, synthetic oils, natural oils, and the like, including but not limited to poly alpha olefins, linear alpha olefins, internal olefins, linear paraffins, linear alkyl benzene and others. Oil based invert emulsion drilling fluids are typically formulated with an Oil/Water Ratio (OWR) of about 90/10 to about 40/60, with water as the aqueous internal phase, typically about 75/25 OWR, meaning of the two components 75 volume percent is oil and 25 volume percent is water. The water is typically in the form of brine, which provides salt, such as calcium chloride, for osmotic shale stability.

The subject organoclay compositions yield surprising results when utilized in high temperature drilling fluids. By use of such additives an oil base drilling fluid composition may be provided which has a stable high viscosity and high gel strength at use temperatures up to at least 400° F.

Where utilized in high temperature drilling fluids, the oil vehicle utilized with the subject organoclays may be one which is environmentally benign, by which is meant that the oil is one that over a reasonable course of time will biodegrade in the ground into relatively harmless products.

Oils of this type are well known for use in drilling fluids and similar applications, and are commonly a hydrotreated light distillate. The resultant product contains minimal, if any quantities of aromatic components, and mostly short chain hydrocarbons. The LVT® oil of Calumet Penrico, LLC, and the Low Toxicity Drilling Mud Oil of ExxonMobil, such as those based on ESCAID™ fluids, are commercial examples of such products. Synthesized biodegradable oils based on alpha olefins or the like are also acceptable for the present use, such as AMODRILL® olefin fluid by INEOS USA, LLC, as well as ODC® high purity hydrocarbons of Sasol North America, Inc.

The drilling fluid may contain, in certain embodiments, from about 1 to about 15 lbs/barrel, in some embodiments about 3 to about 8 lbs/barrel, of the subject organoclay rheological additive, taking into account the particular formulation, including mud weight, oil water ratio, type of fluid and the like. The drilling fluids may also contain conventional additives. As used herein the term "barrel" refers to that volume which is standard in oil field practice and contains 42 U.S. gallons.

A number of other additives, in addition to the subject rheological additives, are typically used in the oil-based or invert emulsion drilling fluid, to provide particular desired application properties. The subject rheological additives, at least in part, regulate viscosity and anti-settling properties.

An acid gas scavenger, such as lime $(Ca(OH)_2)$ is often added to the drilling fluid, and may react with some emulsifiers or with gases such as $H_2S$ during drilling. Emulsifiers or emulsifier systems (such as primary and secondary emulsifiers) may form or stabilize the invert emulsion, and/or may additionally serve as wetting agents for solids. These emulsifiers may include, but are not limited to, fatty acid derivatives, amidoamines, amide-imidoamines and polymer surfactants. Weighting agents, such as barite, balance downhole pressure, and other additives may be included, such as fluid loss-prevention additives and bridging agents.

In certain embodiments, invert emulsion drilling fluids may be formed by mixing the desired individual components to make up the drilling fluid. Surfactants, such as the primary and secondary emulsifiers and wetting agents are added to the base oil continuous phase with moderate agitation. The water phase, such as a brine, is added to the base oil/surfactant mixture together with alkalinity control agents and acid gas scavengers. The rheological additives, fluid loss control materials, weighting agents and corrosion inhibition chemicals are also added, with sufficient mixing to ensure homogeneous dispersion of the ingredients in the fluid. The subject organoclay rheology additive may be pre-blended with other ingredients before addition to the base fluid, or it may be added by itself. In certain embodiments, the organoclay is added to the base fluid first, then emulsifiers, then brine, and then other additives.

EXAMPLES

Each of the Example and Comparative Example samples described below were prepared and tested as described herein and according to API RP 13B-2, "Recommended Practice for Field Testing of Oil-based Drilling Fluids", Fifth Edition, which is incorporated herein by reference. After mixing was complete, each of the Example and Comparative Example samples were placed in a thermocup of a direct-indicating viscometer ("Viscometer"), and run at 600 rpm while increasing the temperature of each sample to 120° F., as described below. Once this temperature was reached, rheology characteristics were measured using the Viscometer at 600, 300, 200, 100, 6 and 3 rpm, in order to obtain a rheology profile of each sample. It is noted that the Viscometer's output is in "dial readings" at a given rpm, which may be converted to centipoise, but the industry standard is to merely utilize the dial readings for simplicity.

The plastic viscosity ("PV") of each sample was then calculated by subtracting the measurement at 300 rpm from the measurement at 600 rpm. The yield point of each sample was also calculated, by subtracting the PV from the measurement at 300 rpm. The gel strength ("GS") is the maximum deflection (dial reading) taken at 3 rpm after a period of rest. Gel strengths were measured for each sample after 10 seconds and 10 minutes of rest.

After initial measurements were taken, each of the Example and Comparative Example samples were hot-rolled at 400° F. for 16 hours. After hot-rolling, each sample was allowed to cool to room temperature, mixed for 5 minutes with enough shear to create a small vortex, transferred to the thermocup of the Viscometer, and subjected to the same testing as was each sample prior to hot-rolling, as described above. Measurements and calculations for each sample were taken as described in the initial testing described above.

Examples

Samples 1-5

15 pounds per gallon (ppg) Mud Weight, 85/15 Oil Water Ratio (OWR); with drill solids

| Formula - 15 ppg MW; 85/15 OWR | | |
|---|---|---|
| | grams | mixing |
| Amodrill 1000 | 151 | start mixer |
| Organoclay | 4 | Mix 5 min |
| Lime | 5 | Mix 5 min |
| EnvaMul 1699 | 10 | Mix 5 min |
| 25% CaCl2 | 45 | Mix 10 min |
| Pliolite DF01 | 4 | Mix 5 min |
| Barite | 384 | Mix 5 min |
| OCMA | 26 | Mix 5 min |

Procedure

1. After mixing ingredients as given in table using an overhead mixer or multimixer, place mixing container on Silverson™ mixer.
2. Mix at 60% of Rheostat power until temperature reaches 57-60° C.
3. Transfer to Thermo cup and test as described previously.

TABLE 1

| | | | Organoclay Formulation | | | | |
|---|---|---|---|---|---|---|---|
| Sample | Dry wt. g | % Sepiolite | % Montmorillonite | 2M2HT MER | 2M2HT g | C18EO15 MER | C18EO15 g |
| 1 | 60 | 50 | 50 | 73.9 | 30.23 | 24.6 | 14.4 |
| 2 | 60 | 22 | 78 | 92.5 | 37.8 | 20.6 | 12.9 |
| 3 | 60.8 | 0 | 100 | 71.2 | 29.9 | 23.8 | 14.1 |
| 4 | 60.8 | 0 | 100 | 93.8 | 39.4 | 31.2 | 18.6 |

Sample 5 is a commercial organohectorite product.

The results of the testing of the organoclays of Table 1 and the comparative commercial organohectorite at 120° F. at 600 RPM, 6 RPM and for Yield Point (YP) are set forth in Table 2, showing the values initially, and after heat rolling at 400° F. (AHR-400).

TABLE 2

| Sample | 600-I | 600-400 | 6-I | 6-400 | YP-I | YP-400 |
|--------|-------|---------|-----|-------|------|--------|
| 1 | 112 | 137.7 | 10 | 8.3 | 18 | 19 |
| 2 | 108 | 122 | 11 | 5.5 | 23 | 9 |
| 3 | 101 | 111 | 9.5 | 4.5 | 14 | 7 |
| 4 | 111 | 116.5 | 10 | 6 | 23 | 12.5 |
| 5 | 114 | 148 | 13 | 6 | 25 | 13 |

FIG. 1 is a graphical representation of the 600 RPM test results for Samples 1-5, initially and after hot rolling at 400° F., based on data from Table 2. Although the results show some increase in dial reading at 600 rpm after hot rolling at 400° F. (AHR400), none of Samples 1-4 are out of the reasonable range and are at least as stable as the competitive organohectorite, Sample 5.

FIG. 2 is a graphical representation of the 6 RPM test results for Samples 1-5, initially and after hot rolling at 400° F. based on data from Table 2. Sample 1 in particular exhibits increased stability after high temperature hot roll testing as compared to the other Samples. The results show a decrease in all samples after hot rolling at 400° F. The decrease in Sample 1 is significantly less than the other samples including the competitive product (Sample 5) indicating this organoclay sample is significantly more stable than the others. Samples 2 also decreased less than the competitive product sample under the conditions tested. Sample 4 which is 100% montmorillonite, is as good as the competitive sample after hot rolling under these test conditions. Sample 4 also contradicts the teachings of the prior art, which teaches montmorillonite to be ineffective at temperatures above 350° F., even if modified with quaternary amine surfactant.

FIG. 3 is a graphical representation of the Yield Point test results for the various organoclays initially and after hot rolling at 400° F. based on the data in Table 2. Again, Sample 1 exhibits better stability after high temperature hot roll testing than the other Samples. The results show a decrease in all samples after hot rolling at 400° F. except Sample 1. The stability of Sample 1 is very good whereas the all the other samples show a significant drop in YP value under the conditions tested. Surprisingly, the Sample 4 (100% montmorillonite) is as good as the competitive product Sample 5 under the conditions tested.

A complete report of the test results for Samples 1-5 are set forth in Table 3, below.

TABLE 3

| | Sample No. | | | | | | | | | |
|---|---|---|---|---|---|---|---|---|---|---|
| | 1 | | 2 | | 3 | | 4 | | 5 | |
| Test | Initial | AHR-400 | Initial | AHR-400 | Initial | AHR-400 | Initial | AHR-400 | Initial | AHR-400 |
| 600 RPM | 112 | 138 | 108 | 122 | 101 | 111 | 111 | 117 | 114 | 148 |
| 300 RPM | 65 | 78 | 65.5 | 66 | 58 | 59 | 67 | 65 | 69 | 80 |
| 200 RPM | 49 | 56 | 49.5 | 45 | 44 | 41 | 49 | 46 | 52 | 57 |
| 100 RPM | 32 | 33 | 33 | 26 | 29 | 23 | 32 | 27 | 35 | 32 |
| 6 RPM | 10 | 8 | 11 | 6 | 10 | 5 | 10 | 6 | 13 | 6 |
| 3 RPM | 9 | 6 | 9 | 5 | 9 | 3 | 9 | 5 | 12 | 5 |
| 10 sec gel | 8 | 6 | 8.5 | 4 | 7 | 3 | 8 | 5 | 11 | 5 |
| 10 min gel | 9 | 7 | 9 | 5 | 7 | 4 | 7 | 4 | 12 | 6 |
| PV | 47 | 59 | 42.5 | 57 | 44 | 52 | 44 | 52 | 45 | 68 |
| YP | 18 | 19 | 23 | 9 | 14 | 7 | 23 | 13 | 25 | 13 |

The subject organoclays combine the performance of mixed surfactant chemistries and mixed clay mineral morphologies to achieve surprising synergies as a rheology modifier for oil based drilling fluids in the stability of the drilling fluids under high pressure/high temperature conditions. The subject organoclays are able to utilize the abundant montmorillonite clay as one of the components. This is surprising because it is well considered in the industry that montmorillonite organoclays are not stable at higher temperatures.

Use of montmorillonite in the clay mixture improves the initial properties of the subject rheology additive. The total combination of the clay mixture and quaternary ammonium compound blend provides equal or improved stability over current competitive rheology additive products.

The subject organoclay compositions described above may also be used as a viscosity or rheology control agent, such as a thickening agent, or in some embodiments as a thixotroping agent, in liquid compositions other than drilling fluids, preferably in non-aqueous liquid compositions. A "liquid composition" in the present context is a composition which is in a liquid state at the temperature at which it is used and also contains the subject organoclay composition. These non-aqueous compositions may include oil-based paints and coatings as well as oil-based inks, varnishes, enamels, waxes, greases, mastics, caulks, binders, adhesives, sealants, lubricants, pigment dispersions, pigment printing pastes and consumer products such as cosmetics (lipstick, deodorant, nail polish and the like).

A "liquid organic composition" is a liquid composition containing the subject organoclay composition and at least one further chemical entity belonging to organic entities. Such organic entities can e.g. be compounds or polymers, or mixtures thereof and with each other. Beside non-soluble ingredients, as e.g. fillers and pigments which may also be contained in the liquid organic compositions, the organic entities which differ from the subject organoclay compositions may also be contained. In certain embodiments, the organoclay composition may typically be used in an additive amount, i.e. an amount of greater than 0% to about 10% by weight to improve the application properties of liquid organic composition. Such liquid organic compositions may contain the subject organoclay composition in an additive amount from about 0.1 to about 10 wt %, in some embodiments from about 0.1 to about 8 wt % and in certain embodiments from about 0.5 to about 5 wt %, based on the total weight of the liquid organic composition.

In certain embodiments, the liquid composition may comprise at least one epoxy resin or at least one unsaturated polyester, such as for example in coatings, adhesives, sealants, moulding compounds, plastic materials and composite materials like nanocomposites.

The subject organoclay composition may be stirred and dispersed directly in an epoxy resin solution to provide highly satisfactory gelling properties. Epoxy resins contain in average more than one oxirane ring per molecule, and can be cured with hardeners or "curing agents" by reaction of the oxirane ring with a functional group of the hardener which is reactive towards the oxirane ring. Commonly used epoxy resins are formed by reacting reactive phenols, alcohols, acids and/or amines with epichlorohydrin. The oxirane ring may be present in the epoxy resins in form of a glycidyl group. Unsaturated aliphatic and cycloaliphatic compounds may be epoxidized, such as with peracetic acid. Hardeners may be selected from the group consisting of diamines, polyamines, polyamides and cyclic carboxylic acid anhydrides.

Unsaturated polyester containing formulations contain at least one unsaturated polyester, as understood by the person skilled in the art of unsaturated polyesters (UP) and unsaturated polyester resins (UP resins). Accordingly the term "unsaturated polyester resin" is understood as being a reaction resin comprising polyesters, where at least one of the components forming the polyester, such as a multivalent alcohol (such as a diol) and/or a multivalent carboxylic acid (such as a dicarboxylic acid), is ethylenically unsaturated and is copolymerizable with monomeric polymerizable compounds. In other words, the "unsaturated polyesters" contain one or more ethylenically unsaturated carbon double bonds which can react with ethylenically unsaturated monomers. The at least one unsaturated polyester may be blended with at least one ethylenically unsaturated monomer serving as crosslinking agent. The curing reaction is the copolymerization of the at least one ethylenically unsaturated monomer with the double bonds of the unsaturated polyester.

The ethylenically unsaturated monomers contain a carbon-carbon double bond, for example, present as a vinyl group, allyl group, acrylate group, methacrylate group or in a non-terminal region of the monomer. The ethylenically unsaturated monomers may have a low vapor pressure, and may be able to serve as a solvent for the unsaturated polyester as well as copolymerize with the unsaturated polyester. Unsaturated polyester containing formulations may be semi-finished products which can be transformed into crosslinked products on the basis of incorporated double bonds which copolymerize with ethylenically unsaturated monomers, such as styrene or vinyl toluene, which can be employed as chemically reactive solvents.

The subject organoclay compositions may be used in non-unsaturated polyester based coating materials, adhesives and sealants, as well as thermoplastic moulding compounds and reinforced thermoplastic composites and the like.

The subject organoclay additives may also be used in preparing nanocomposites by any known methods, and with a large variety of polymerizable polymers such as polyamides, epoxy resins, polyvinyl resins, polyacrylamides, etc. When used in composites such as nanocomposites, the subject organoclay compositions yield improvements in the mechanical and other properties of the composite, including those with respect to tensile strength, tensile modulus and flex modulus, all of which are highly significant attributes.

Therefore, in a first embodiment there is provided an organoclay composition comprising a mineral clay mixture which has been treated with a combination of at least one alkyl or alkenyl quaternary ammonium salt and at least one alkoxylated quaternary ammonium salt, said mixture comprising:

mineral clay (a) comprising about 15 to about 60 wt. %, based on the weight of the mineral clay mixture, of sepiolite; and mineral clay (b) comprising about 40 to about 85 wt. % based on the weight of the mineral clay mixture, of montmorillonite.

In the organoclay composition of the first embodiment, mineral clay (a) may be present in an amount of about 20 to about 55 wt. %, based on the weight of the mineral clay mixture, and mineral clay (b) may be present in an amount of about 45 to about 80 wt. %, based on the weight of the mineral clay mixture.

In the organoclay composition of the first embodiment, mineral clay (a) may be present in an amount of about 20 to about 50 wt. %, based on the weight of the mineral clay mixture, and mineral clay (b) may be present in an amount of about 50 to about 80 wt. %, based on the weight of the mineral clay mixture.

In the organoclay composition of the first embodiment, the alkoxylated quaternary ammonium salt may comprise a compound having formula (I):

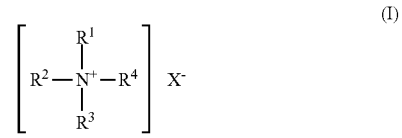

(I)

wherein N is nitrogen; $X^-$ comprises an anion selected from the group consisting of chloride, methyl sulfate, acetate, iodide, bromide, and mixtures thereof; $R^1$ comprises a $C_{12}$ to $C_{30}$ linear or branched, saturated or unsaturated alkyl or alkenyl group; $R^2$ comprises H— or a $C_1$ to $C_{30}$ linear or branched, saturated or unsaturated alkyl or alkenyl group; $R^3$ comprises H—, $C_1$ to $C_4$ linear or branched, saturated or unsaturated alkyl or alkenyl group or $R^4$; and, $R^4$ comprises —$(CR^9R^{10}$—$CR^{11}R^{12}O)_y$H, or —$CR^9R^{10}$—$CR^{11}R^{12}$—$CR^{13}R^{14}O)_y$H, where $R^9$, $R^{10}$, $R^{11}$, $R^{12}$, $R^{13}$ and $R^{14}$ are independently selected from the group consisting of H—, $CH_3$—, and $CH_3CH_2$— and y is 4 to about 20 on average.

In this organoclay composition embodiment, preferably $R^1$ comprises a $C_{12}$ to $C_{22}$, optionally a $C_{14}$-$C_{22}$, and further optionally a $C_{16}$ to $C_{18}$ linear or branched, saturated or unsaturated alkyl or alkenyl group, $R^2$ comprises H—, methyl, or a $C_{16}$ to $C_{18}$ linear saturated alkyl group; $R^9$, $R^{10}$, $R^{11}$, $R_{12}$, $R_{13}$ and $R^{14}$ are independently selected from the group consisting of H—, $CH_3$—, and $CH_3CH_2$—, optionally H—, or $CH_3$—, and further optionally H—.

In this organoclay composition embodiment, further preferably $R^1$ comprises a $C_{16}$ to $C_{18}$ linear saturated alkyl group; $R^2$ comprises a methyl group; $R^3$ and $R^4$ are $(CR^9R^{10}$—$CR^{11}R^{12}O)_y$H where $R^9$, $R^{10}$, $R^{11}$, $R_{12}$ are independently selected from the group consisting of H—, $CH_3$—, and $CH_3CH_2$—, and y is 4 to about 15 on average.

In one organoclay composition embodiment, $R^9$, $R^{10}$, $R^{11}$, and $R^{12}$ are H and y is on average about 7.5.

In the above organoclay composition embodiments, the alkoxylated quaternary ammonium salt may comprise at least one of methyl bis(polyoxyethylene [15])cocoalkyl quaternary ammonium chloride, methyl bis(polyoxyethylene [15])oleyl quaternary ammonium chloride, and methyl bis (polyoxyethylene [15])octadecyl quaternary ammonium chloride, wherein the numbers in brackets refer to the total number of ethylene oxide units.

In any of the above organoclay composition embodiments, the alkyl or alkenyl quaternary ammonium salt may comprise a compound having formula (II):

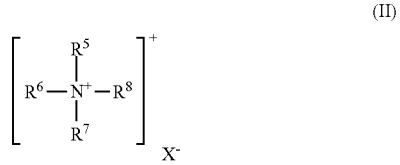

wherein N is nitrogen; X⁻ comprises an anion selected from the group consisting of chloride, methyl sulfate, acetate, iodide, bromide, and mixtures thereof; $R^5$ comprises a linear or branched, saturated or unsaturated aliphatic hydrocarbon group having from 8 to 30 carbon atoms; and, $R^6$, $R^7$, and $R^8$ are independently selected from the group consisting of: a) linear or branched, saturated or unsaturated aliphatic hydrocarbon, having from 1 to about 30 carbon atoms; b) allyl, vinyl, or other alkenyl or alkynyl groups possessing reactive unsaturation and having from 2 to about 30 carbon atoms; and c) hydrogen.

In this organoclay composition embodiment, preferably $R^5$ is a $C^{12}$ to $C_{22}$ linear or branched saturated alkyl group, optionally a $C_{14}$-$C_{22}$ linear or branched saturated alkyl group; and further optionally a $C_{16}$ to $C_{18}$ linear or branched saturated alkyl group.

In this organoclay composition embodiment, further preferably $R^5$ and one of $R^6$, $R^7$, and $R^8$ is a $C_{14}$-$C_{22}$ alkyl group, and two of $R^6$, $R^7$, and $R^8$ is a methyl group.

In the above organoclay composition embodiments, the alkyl or alkenyl quaternary ammonium salt may be selected from the group consisting of dimethyl bis[fatty alkyl]ammonium quaternary salt, methyl tris[fatty alkyl]ammonium quaternary salt, dimethyl bis[hydrogenated tallow]ammonium chloride (2M2HT), methyl tris[hydrogenated tallow alkyl]chloride (M3HT) and mixtures thereof.

In any of the above organoclay composition embodiments, the mineral clay mixture may be treated with about 45 to about 100 milliequivalents of the alkyl or alkenyl quaternary ammonium salt per 100 g of the mineral clay mixture.

In any of the above organoclay composition embodiments, the mineral clay mixture may be treated with about 15 to about 45 milliequivalents of the alkoxylated quaternary ammonium salt per 100 g of the mineral clay mixture.

In any of the above organoclay composition embodiments, the mineral clay mixture may be treated with an amount of about 80% to about 160% of the cation exchange capacity for the alkyl or alkenyl quaternary ammonium salt and about 10% to about 70% of the cation exchange capacity for the alkoxylated quaternary ammonium salt, optionally about 100% to about 150% for the alkyl or alkenyl quaternary ammonium salt and about 13% to about 62% for the alkoxylated quaternary ammonium salt, and further optionally about 110% to about 140% for the alkyl or alkenyl quaternary ammonium salt and about 19% to about 53% for the alkoxylated quaternary ammonium salt.

In a second embodiment there is provided a drilling fluid comprising a hydrocarbon-based or invert emulsion drilling fluid based composition, and the organoclay composition of any one of the above organoclay composition embodiments.

The drilling fluid of the second embodiment may comprise from about 1 to about 15 lbs/barrel of the organoclay composition.

The drilling fluid of the second embodiment may comprise from about 3 to about 8 lbs/barrel of the organoclay composition.

In any of the above drilling fluid embodiments, the base fluid may comprise at least one of diesel oil, mineral oil, synthetic oil, natural oil, alpha olefins, poly alpha olefins, linear alpha olefins, internal olefins, linear paraffins, linear alkyl benzene and biodegradable oils.

In any of the above drilling fluid embodiments, the drilling fluid may have an Oil/Water Ratio (OWR) of about 90/10 to about 40/60.

In any of the above drilling fluid embodiments, the water of the aqueous internal phase may be a brine.

Any of the above drilling fluid embodiments may further comprise at least one of an emulsifier, optionally a primary and a secondary emulsifier, an acid gas scavenger, a weighting agent, a fluid loss control additive, a bridging agent, an alkalinity control agent, a non-clay rheological additive, and a corrosion inhibitor.

In a third embodiment, any one of the above organoclay composition embodiments may be used as a viscosity or rheology control agent, such as a thickening agent, or a thixotroping agent, in non-aqueous liquid compositions.

In the third embodiment, the non-aqueous compositions may include oil-based paints or coatings, oil-based inks, varnishes, enamels, waxes, greases, mastics, caulks, binders, adhesives, sealants, lubricants, pigment dispersions, pigment printing pastes and consumer products such as cosmetics.

In a fourth embodiment, a liquid composition may contain any one of the above organoclay composition embodiments and at least one further organic chemical entity.

In the fourth embodiment, the liquid composition may comprise at least one epoxy resin or at least one unsaturated polyester, optionally for use as coatings, adhesives, sealants, moulding compounds, plastic materials or composite materials like nanocomposites.

In a fifth embodiment, any one of the above organoclay composition embodiments may be used in non-unsaturated polyester based coating materials, adhesives, sealants, thermoplastic moulding compounds, or reinforced thermoplastic composites.

In a sixth embodiment, any one of the above organoclay composition embodiments may be used in preparing nanocomposites, and/or with polymerizable polymers, optionally polyamides, epoxy resins, polyvinyl resins, or polyacrylamides.

Although the embodiments have been described in detail through the above description and the preceding examples, these examples are for the purpose of illustration only and it is understood that variations and modifications can be made by one skilled in the art without departing from the spirit and the scope of the disclosure. It should be understood that the embodiments described above are not only in the alternative, but can be combined.

What is claimed is:

1. An organoclay composition comprising a mineral clay mixture which has been treated with a combination of at least one alkyl or alkenyl quaternary ammonium salt and at least one alkoxylated quaternary ammonium salt, said mixture comprising:
   mineral clay (a) comprising about 20 to about 50 wt. %, based on the weight of the mineral clay mixture, of sepiolite; and
   mineral clay (b) comprising about 50 to about 80 wt. % based on the weight of the mineral clay mixture, of montmorillonite.

2. The organoclay composition of claim 1, wherein the alkoxylated quaternary ammonium salt comprises a compound having formula (I):

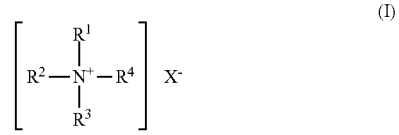

wherein N is nitrogen; X⁻ comprises an anion selected from the group consisting of chloride, methyl sulfate, acetate, iodide, bromide, and mixtures thereof; $R^1$ comprises a $C_{12}$ to $C_{30}$ linear or branched, saturated or unsaturated alkyl or alkenyl group; $R^2$ comprises H— or a $C_1$ to $C_{30}$ linear or branched, saturated or unsaturated alkyl or alkenyl group; $R^3$ comprises H—, $C_1$ to $C_4$ linear or branched, saturated or unsaturated alkyl or alkenyl group or $R^4$; and, $R^4$ comprises —$(CR^9R^{10}—CR^{11}R^{12}O)_y$H, or —$(CR^9R^{10}—CR^{11}R^{12}—CR^{13}R^{14}O)_y$ H, where $R^9$, $R^{10}$, $R^{11}$, $R^{13}$ and $R^{14}$ are independently selected from the group consisting of H—, $CH_3$—, and $CH_3CH_2$— and y is 4 to about on average.

3. The organoclay composition of claim 2, wherein $R^1$ comprises a $C_{12}$ to $C_{22}$, optionally a $C_{14}$-$C_{22}$, and further optionally a $C_{16}$ to $C_{18}$ linear or branched, saturated or unsaturated alkyl or alkenyl group, $R^2$ comprises H—, methyl, or a $C_{16}$ to $C_{18}$ linear saturated alkyl group; $R^9$, $R^{10}$, $R^{11}$, $R^{12}$, and $R^{14}$ are independently selected from the group consisting of H—, $CH_3$—, and $CH_3CH_2$—, optionally H—, or $CH_3$—, and further optionally H—.

4. The organoclay composition of claim 2, wherein $R^1$ comprises a $C_{16}$ to $C_{18}$ linear saturated alkyl group; $R^2$ comprises a methyl group; $R^3$ and $R^4$ are $(CR^9R^{10}—CR^{11}R^{12}O)_y$H where $R^9$, $R^{10}$, $R^{11}$, and $R^{12}$ are independently selected from the group consisting of H—, $CH_3$—, and $CH_3CH_2$—, and y is 4 to about 15 on average.

5. The organoclay composition of claim 4, wherein $R^9$, $R^{10}$, $R^{11}$, and $R^{12}$ are H and y is on average about 7.5.

6. The organoclay composition of claim 1, wherein the alkoxylated quaternary ammonium salt comprises at least one of methyl bis(polyoxyethylene [15])cocoalkyl quaternary ammonium chloride, methyl bis(polyoxyethylene [15]) oleyl quaternary ammonium chloride, and methyl bis(polyoxyethylene [15])octadecyl quaternary ammonium chloride, wherein the numbers in brackets refer to the total number of ethylene oxide units.

7. The organoclay composition of claim 1, wherein the alkyl or alkenyl quaternary ammonium salt comprises a compound having formula (II):

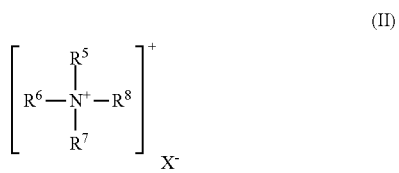

wherein N is nitrogen; X⁻ comprises an anion selected from the group consisting of chloride, methyl sulfate, acetate, iodide, bromide, and mixtures thereof; $R^5$ comprises a linear or branched, saturated or unsaturated aliphatic hydrocarbon group having from 8 to 30 carbon atoms; and, $R^6$, $R^7$, and $R^8$ are independently selected from the group consisting of:

a) linear or branched, saturated or unsaturated aliphatic hydrocarbon, having from 1 to about 30 carbon atoms; b) allyl, vinyl, or other alkenyl or alkynyl groups possessing reactive unsaturation and having from 2 to about 30 carbon atoms; and c) hydrogen.

8. The organoclay composition of claim 7, wherein $R^5$ is a $C_{12}$ to $C_{22}$ linear or branched saturated alkyl group, optionally a $C_{14}$-$C_{22}$ linear or branched saturated alkyl group; and further optionally a $C_{16}$ to $C_{18}$ linear or branched saturated alkyl group.

9. The organoclay composition of claim 7, wherein $R^5$ and one of $R^6$, $R^7$, and $R^8$ is a $C_{14}$-$C_{22}$ alkyl group, and two of $R^6$, $R^7$, and $R^8$ is a methyl group.

10. The organoclay composition of claim 1, wherein the alkyl or alkenyl quaternary ammonium salt is selected from the group consisting of dimethyl bis[fatty alkyl]ammonium quaternary salt, methyl tris[fatty alkyl]ammonium quaternary salt, dimethyl bis[hydrogenated tallow]ammonium chloride (2M2HT), methyl tris[hydrogenated tallow alkyl] chloride (M3HT) and mixtures thereof.

11. The organoclay composition of claim 1, wherein the mineral clay mixture is treated with about 45 to about 100 milliequivalents of the alkyl or alkenyl quaternary ammonium salt per 100 g of the mineral clay mixture.

12. The organoclay composition of claim 1, wherein the mineral clay mixture is treated with about 15 to about 45 milliequivalents of the alkoxylated quaternary ammonium salt per 100 g of the mineral clay mixture.

13. The organoclay composition of claim 1, wherein the mineral clay mixture is treated with an amount of about 80% to about 160% of the cation exchange capacity for the alkyl or alkenyl quaternary ammonium salt and about 10% to about 70% of the cation exchange capacity for the alkoxylated quaternary ammonium salt, optionally about 100% to about 150% for the alkyl or alkenyl quaternary ammonium salt and about 13% to about 62% for the alkoxylated quaternary ammonium salt, and further optionally about 110% to about 140% for the alkyl or alkenyl quaternary ammonium salt and about 19% to about 53% for the alkoxylated quaternary ammonium salt.

14. A drilling fluid comprising a hydrocarbon-based or invert emulsion drilling fluid based composition, and the organoclay composition of claim 1.

15. The drilling fluid of claim 14, comprising from about 1 to about 15 lbs/barrel of the organoclay composition.

16. The drilling fluid of claim 14 comprising from about 3 to about 8 lbs/barrel of the organoclay composition.

17. The drilling fluid of claim 14, wherein the base fluid comprises at least one of diesel oil, mineral oil, synthetic oil, natural oil, alpha olefins, poly alpha olefins, linear alpha olefins, internal olefins, linear paraffins, linear alkyl benzene and biodegradable oils.

18. The drilling fluid of claim 14, having an Oil/Water Ratio (OWR) of about 90/10 to about 40/60.

19. The drilling fluid of claim 14, wherein the water of the aqueous internal phase is a brine.

20. The drilling fluid of claim 14, further comprising at least one of an emulsifier, optionally a primary and a secondary emulsifier, an acid gas scavenger, a weighting agent, a fluid loss control additive, a bridging agent, an alkalinity control agent, a non-clay rheological additive, and a corrosion inhibitor.

21. An organoclay composition comprising a mineral clay mixture which has been treated with a combination of at least one alkyl or alkenyl quaternary ammonium salt and at least one alkoxylated quaternary ammonium salt, said mixture comprising:

mineral clay (a) comprising about 15 to about 60 wt. %, based on the weight of the mineral clay mixture, of sepiolite; and mineral clay (b) comprising about 40 to about 85 wt. % based on the weight of the mineral clay mixture, of montmorillonite, wherein the alkoxylated quaternary ammonium salt comprises at least one of methyl bis(polyoxyethylene [15]) cocoalkyl quaternary ammonium chloride, methyl bis (polyoxyethylene [15])oleyl quaternary ammonium chloride, and methyl bis(polyoxyethylene [15])octadecyl quaternary ammonium chloride, wherein the numbers in brackets refer to the total number of ethylene oxide units.

22. The organoclay composition of claim 21, wherein mineral clay (a) is present in an amount of about 20 to about 55 wt. %, based on the weight of the mineral clay mixture, and mineral clay (b) is present in an amount of about 45 to about 80 wt. %, based on the weight of the mineral clay mixture.

23. The organoclay composition of claim 21, wherein the alkyl or alkenyl quaternary ammonium salt is selected from the group consisting of dimethyl bis[fatty alkyl]ammonium quaternary salt, methyl tris[fatty alkyl]ammonium quaternary salt, dimethyl bis[hydrogenated tallow]ammonium chloride (2M2HT), methyl tris[hydrogenated tallow alkyl] chloride (M3HT) and mixtures thereof.

24. A drilling fluid comprising a hydrocarbon-based or invert emulsion drilling fluid based composition, and the organoclay composition of claim 21.

25. The drilling fluid of claim 24, comprising from about 1 to about 15 lbs/barrel of the organoclay composition.

* * * * *